(12) United States Patent
Monson et al.

(10) Patent No.: US 6,848,631 B2
(45) Date of Patent: Feb. 1, 2005

(54) FLAT FAN DEVICE

(76) Inventors: Robert James Monson, 1027 Brenner Ave., St. Paul, MN (US) 55113; Allen L. Arndt, 12228 Allen Dr., Burnsville, MN (US) 55337

( * ) Notice: Subject to any disclaimer, the term of this patent is extended or adjusted under 35 U.S.C. 154(b) by 348 days.

(21) Appl. No.: 10/055,752

(22) Filed: Jan. 23, 2002

(65) Prior Publication Data

US 2003/0177899 A1 Sep. 25, 2003

(51) Int. Cl.$^7$ ............................. B05B 17/06; B05B 1/08
(52) U.S. Cl. ............................. 239/102.1; 239/102.2; 239/4; 239/13; 239/423
(58) Field of Search .................... 239/102.1, 102.2, 239/4, 11, 423, 13, 99

(56) References Cited

U.S. PATENT DOCUMENTS

| | | | |
|---|---|---|---|
| 3,744,242 A | 7/1973 | Stettler et al. .............. 60/39.29 |
| 4,363,991 A | 12/1982 | Edleman .................... 310/316 |
| 4,606,137 A | 8/1986 | Whipple ...................... 34/156 |
| 4,667,877 A * | 5/1987 | Yao et al. ................. 239/102.2 |
| 4,780,062 A | 10/1988 | Yamada et al. ............. 417/322 |
| 4,930,705 A | 6/1990 | Broerman ................ 235/590.5 |
| 5,040,560 A | 8/1991 | Glezer et al. .................. 137/13 |
| 5,042,072 A | 8/1991 | Button ........................ 381/192 |
| 5,099,752 A | 3/1992 | Bosley ........................ 454/131 |
| 5,203,563 A * | 4/1993 | Loper, III ............... 273/148 B |
| 5,357,586 A | 10/1994 | Nordschow et al. ........ 381/199 |
| 5,361,989 A * | 11/1994 | Merchat et al. .......... 239/102.2 |
| 5,413,145 A * | 5/1995 | Rhyne et al. .................. 138/44 |
| 5,461,193 A | 10/1995 | Schertler ...................... 84/727 |
| 5,487,114 A | 1/1996 | Dinh .......................... 381/192 |
| 5,497,428 A | 3/1996 | Rojas ......................... 381/199 |
| 5,758,823 A | 6/1998 | Glezer et al. ................... 239/4 |
| 5,823,434 A | 10/1998 | Cooper .................... 230/102.2 |
| 5,894,990 A | 4/1999 | Glezer et al. ............... 239/423 |
| 5,909,015 A | 6/1999 | Yamamoto et al. ......... 181/156 |
| 5,921,757 A | 7/1999 | Tosihiro et al. .......... 417/410.2 |
| 5,938,118 A | 8/1999 | Cooper .................... 239/102.2 |
| 5,961,856 A * | 10/1999 | Fusaro et al. .......... 219/121.47 |
| 6,047,077 A | 4/2000 | Larsen ........................ 381/412 |
| 6,108,433 A | 8/2000 | Norris ......................... 381/399 |
| 6,123,145 A | 9/2000 | Glezer et al. ........... 165/104.33 |
| 6,158,502 A | 12/2000 | Thomas ................. 165/104.26 |
| 6,167,948 B1 | 1/2001 | Thomas ................. 165/104.26 |
| 6,457,654 B1 * | 10/2002 | Glezer et al. ................... 239/4 |

* cited by examiner

*Primary Examiner*—Patrick Brinson (57) ABSTRACT

A fluid flow device in one embodiment comprising a housing having an aperture or a plurality of apertures therein and in another embodiment a single chamber with a piston such as a flexible member forming a chamber and a vibratory member for vibrating the flexible member to simultaneously eject an array of laminar flow fluid vortices that coalesce with each other to form a larger fluid vortex that can be used for direct cooling or for inducing circulation of a cooling fluid within an enclosure to cool the components within the system. When used within a closed system the inventor provides a zero net flux device as the fluid contained within a sealed chamber can be stirred, or mixed, without the introduction of fresh fluid from the outside the system.

24 Claims, 4 Drawing Sheets

FLAT FAN DEVICE

FIELD OF THE INVENTION

The invention relates generally to heat transfer systems and, more specifically, to a low profile, low energy, heat transfer device for generating laminar flow conditions to produce high efficiency heat transfer.

CROSS REFERENCE TO RELATED APPLICATIONS

None

STATEMENT REGARDING FEDERALLY SPONSORED RESEARCH OR DEVELOPMENT

None

REFERENCE TO A MICROFICHE APPENDIX

None

BACKGROUND OF THE INVENTION

The use of a single synthetic fluid jet to produce air flow is not unusual or novel. One such devices is shown in Glezer et al. U.S. Pat. No. 6,123,145. However, we have discovered that when an array of orifices are coupled to a single fluid chamber one can synchronize the ejection of a plurality of synthetic fluid jets to create a low profile flat fan that generates significant, predictable and substantial fluid flow within a system that can be used for efficient cooling of desired components. In addition by limiting fluid flow conditions to a laminar flow one can produce a high efficiency cooling device.

Traditionally, cooling equipment utilizes mechanical cooling device such as rotary fans. For example, in cooling electronic equipment within a cabinet enclosure a single fan or multiple fans can be used. The fans circulate the air within the enclosure to maintain a flow of cooler air across a component or components that need to be cooled. The flow of air across a component in the enclosure is intended to take advantage of Newton's Law of Cooling, which predicts that the amount of cooling, is related to the temperature differential between the flowing air and the component to be cooled. The amount of cooling obtainable within an enclosure, where fluid is circulated by a rotary fan, is dependent on various factors including the ability of the fan to move cooler air across a warmer surface of a component, which results in heat transfer from the warmer surface to the cooler air.

One limitation of using cooling device such as a fan within an enclosure is that the input electrical energy required to power the fan increases the amount of heat within the enclosure. Consequently, the heat produced by the fan must also be dissipated.

Another limitation of a cooling device, such as a fan, is the generation of turbulent air flow. Although the temperature differential between the cooling air and the component is related to the cooling efficiency, if the air flow is turbulent rather than laminar, it can result in significant inefficiencies in heat transfer and thus can significantly degrade the overall efficiency and thus effectiveness of the cooling system.

The use of a synthetic air or gas jet for cooling as to opposed to the use of a rotary fan circumvents many of the inherent problems associated with the use of rotary fans within an enclosure. For example, the aforementioned use of a rotary fan results in significant energy consumption within the cabinet, some of which is expended in the form of heat while a synthetic fluid jet generally adds little heat to the system. As a result, in a cooling system using a rotary fan the excess heat generated by the fan is typically compensated for by either adding more fans or supplying additional power to the fan. Unfortunately both methods of compensation increase the heat load to be dissipated.

In addition as a result of adding more rotary fans or increasing the flow rate the fluid flow paths inside the enclosure can become convoluted and asymmetric causing turbulent or slug flow conditions. The occurrence of turbulent flow or slug flow decreases the heat transfer efficiency. To overcome the decrease in efficiency as a result of turbulent or slug flow one usually supplies more power to the rotary fan system in an effort to increase the flow rate of the fluid within the enclosure chamber.

Thus, the increase in flow rate of fluid within a rotary fan system generally results in several detrimental effects. First, the heat generated in the cabinet increases because of the additional power supplied to the rotary fan. Second, turbulent or slug flow within the cabinet not only decreases the cooling efficiencies it can increase the airborne audible noise. In fact, turbulent fluid flow or slug flow within the cabinet can result in a substantial increase in the audible output of the enclosure as well as structure borne noise due to speaker like output of flat panels impinged by turbulent flow. Finally, the use of large rotary fans to provide cooling within an enclosure can result in high frequency vibrations within the enclosure, often resulting in a degradation of the expected life of the components.

With the present invention a flat fan generates an array of synthetic fluid jets that smoothly blend in to a larger synthetic fluid jet while maintaining laminar flow conditions. At the same time the flat fan array of the present invention requires little energy consumption, generates no audible noise and also produces no discernible vibration within the enclosure while efficiently transferring heat.

DESCRIPTION OF THE RELATED ART

U.S. Pat. No. 4,363,991, entitled Drag Modification Piezoelectric Panels issued Dec. 14, 1982 to Edelman, describes a method and means to increase or decrease the drag exerted by a fluid on the boundary enclosing the fluid. The invention describes a means of measuring the pressure exerted by the fluid on piezoelectric devices located near or on the boundary, and that this pressure signal is utilized to provide control input to a series of piezoelectric actuators which will cause a flexing of the device either towards or away from the flow direction of the fluid. This device is shown applied within vessels such as pipes or other similar fluid conveyance device.

U.S. Pat. No. 5,921,757, entitled Piezoelectric Fan issued Jul. 13, 1999 to Tsutsui et al., describes a Piezoelectric fan comprised of at least one piezoelectric plate of large aspect ratio, with conductive materials located on each side of the plate. Additionally, one side of the plate is formed with stiffening ridges, forcing the piezoelectric element to flex in only one direction. As the piezoelectric element flexes, the element takes on the shape of a low-order wave form, as it is limited in motion in one dimension by the ridges. This waveform amplitude and shape are defined by the potential difference placed across the conductive plates. With careful control of the potential difference, the fan element can be made to wave, producing a desired wind in a desired direction.

U.S. Pat. No. 4,780,062, entitled Piezoelectric Fan issued Oct. 25, 1988 to Yamada, et al., describes a piezoelectric fan which includes a tuning-fork type vibrating element. A blade is attached to the end of the assembly which is excited by means of conductors placed adjacent to the surface of the piezoelectric vibrator element. The element is made to vibrate like a tuning-fork by means of a potential difference across the conductive surfaces. This vibration is utilized as an input to the flexible blade member, which will vibrate with a larger amplitude, thus producing fluid motion. This motion will be away from the tip of the blade, and will fluctuate in velocity. This fan may then be incorporated into a chamber to further facilitate the motion of fluids, as though it were traveling through a pipe. This invention discloses a method of utilizing a piezoelectric element to produce air movement, but does not disclose a synthetic fluid jet technique.

U.S. Pat. No. 5,894,990, entitled Synthetic Jet Actuator and Applications Thereof issued Apr. 20, 1999 to Glezer, et al., describes a synthetic jet actuator, which produces a series of vortices that can be used for entraining adjacent fluid. The jet actuator can be used to bend the output direction of an adjacent jet stream or other such control applications. Glezer notes that a synthetic jet is useful in cooling applications. Glezer notes that a synthetic jet might be directed within an enclosure to blow at a warm surface. Unfortunately, anything placed within the path of a vortex created by a synthetic fluid jet destroys the vortex. Thus the cooling proposed by Glezer ignores the destructive nature of the technique.

SUMMARY OF THE INVENTION

A fluid flow device comprising a housing having a plurality of apertures therein and a single chamber located behind the plurality of apertures with a piston such as a flexible member extending across a side of the chamber and a vibrator member for vibrating the flexible member to simultaneously eject an array of laminar fluid vortices that coalesce with each other to form a larger fluid vortex that can be used for direct cooling or for inducing circulation of a cooling fluid within an enclosure to cool the components within the system. A rotating offset weight can be used with a single aperture to provide a high efficiency vortex generator. When used within a closed system the invention provides a zero net flux device as the fluid contained within a sealed chamber can be stirred, or mixed, without the introduction of fresh fluid from outside the system.

DESCRIPTION OF THE PREFERRED EMBODIMENT

Figure 1:
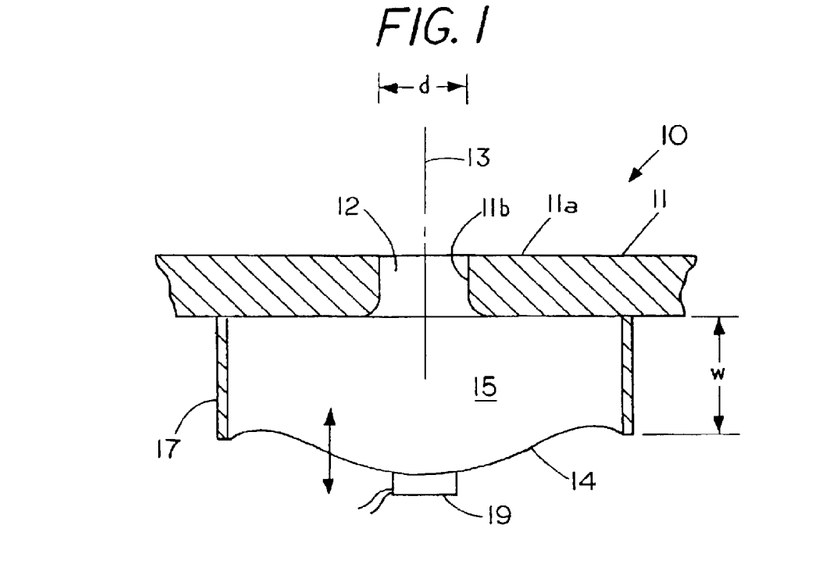
FIG. 1 is a cross-sectional view of a synthetic jet device used to produce movement of a fluid normal to the surface plate.

FIG. 1 shows a schematic view of simple single synthetic fluid jet device for generating a sequence of fluid vortices having the shape of a torus. The device comprises a housing or expelling plate 11, which has a single orifice or aperture 12 having a central axis 13 located normal to a surface 11a and parallel to the sidewall 11b of aperture 12. Expelling plate 11 and sidewall 17 cooperate with membrane 14 to form a chamber 15. While the diameter "d" of the aperture can vary, it is generally accepted that a diameter "d" smaller than the chamber depth "w" is appropriate as this enables the volume change of fluid within the chamber 15 which is partially enclosed by flexible membrane 14 to be sufficient to provide a flow of fluid out of chamber 15 through orifice 12. Expelling plate 11 is made from a rigid material such as metal or plastic in order to maintain the integrity of the apertures therein as well as amount of flow through the apertures.

A vibrator 19, which is adhesively secured to flexible membrane 19, produces vibration in membrane 14 as indicated by the arrows. Vibrator 19 comprises a miniature dc motor having a central rotating shaft with an offset weight located on the shaft. The rotation of the shaft with an offset weight generates substantial vibration with a small amount of energy. The vibrator motor is illustrated in greater detail in FIGS. 8 and 9. In operation of the flat fan device shown in FIG. 1 the flow discharges from chamber 15 orifice 8 and also enters chamber 15 through the same orifice 8, resulting in a zero net flux device. While the present invention is usable with numerous fluids including liquids such as oil and water in most applications a gas such as air is preferred. Optional vibrators could include mounting a movable coil within a fixed magnetic field.

Membrane 14 can be a flexible membrane, or can be a stiff membrane, which has been flexibly attached to the supporting wall 17 secured to housing 11 or could be a slidable piston. The flexible attachment should provide a hinge that is durable enough to allow constant flexing of the hinge, while at the same time providing an airtight seal for the chamber 15 except for the aperture 12. By having aperture 12 the only ingress and egress in housing requires that all the fluid has to flow to or from chamber 15 through the single orifice 12. While a straight sided round aperture 12 is shown and described other shape apertures can be used to provide advantage under special conditions.

Figure 2:
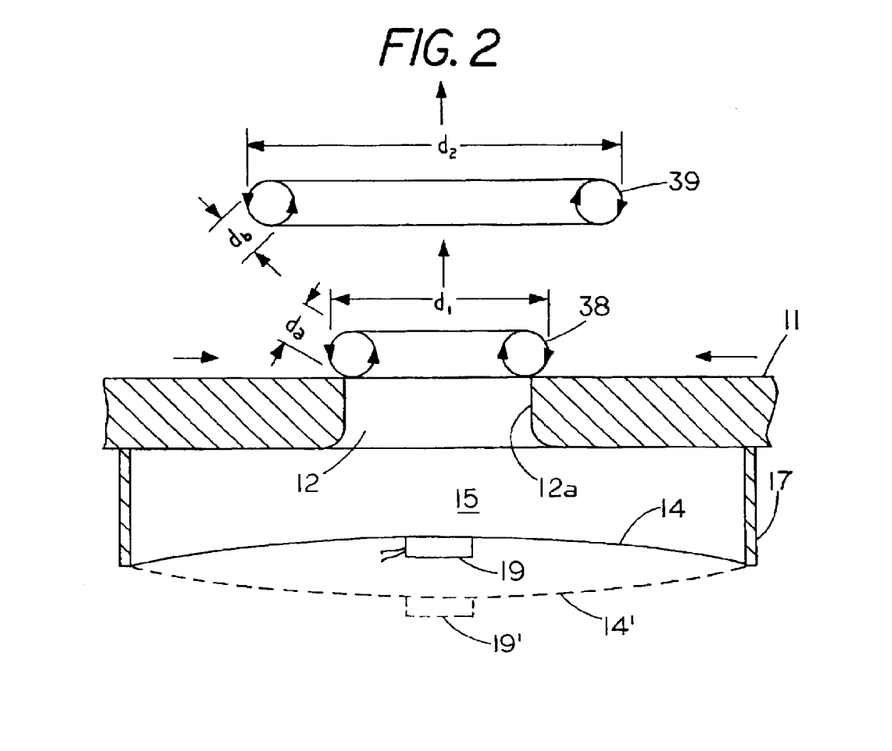
FIG. 2 is the cross sectional view of the synthetic fluid jet device of FIG. 1 illustrating the sequential generation of fluid vortices.

FIG. 2 is the cross sectional view of the synthetic fluid jet device 10 of FIG. 1 illustrating the sequential generation of fluid vortices. A first vortex 38 in the shape of a torus is shown next to expelling plate 11. Vortex 38 has a toroidal diameter indicted by $d_1$ and a cross sectional diameter indicated by $d_a$. A second vortex 39 also in the shape of a torus is shown spaced from expelling plate 11. Vortex 39 has a toroidal diameter indicated by $d_2$ and a cross sectional diameter indicated by $d_b$. FIG. 2 illustrates how a single torus vortex is expelled from an orifice and how the torus diameter and the torus cross sectional diameter increases as the vortex moves away from plate 11. Reference numeral 14 and the solid line indicates the position of the membrane 14 at a moment when chamber 15 is in a minimum volume condition and the dashed lines and reference numeral 14' indicates the position of the membrane when the chamber is in a maximum volume condition.

The flat fan device 10 illustrated in FIG. 1 uses a dc motor with an offset weight that produces substantial vibration of membrane 14 to generate a significant amount of flow without adding a significant amount of heat energy to the system. In the flat fan device 10a set of vortices can be directed away from the expelling plate 11 to cool an object located remotely from the flat fan.

FIG. 2 shows a single synthetic jet 10 with a surface plate 11, a radial spacer 17, a moving membrane 14, and an orifice 12 and a vibrator member 19. This system is designed to be actuated at a high frequency, resulting in essentially continuous formation of vortices in the shape of a torus being discharging from the front of the surface plate 33.

In operation of the system with a fluid such as air, a toroidal shaped vortex 38 is formed by the expulsion of air from the surface plate 11 by means of the moving membrane 14. As a portion of the air in chamber 15 is forced out through orifice 12, the velocity of the portion of air flowing past the outer surface 12a slows because of the boundary layer located along the outer surface 12a. This results in the expelled air traveling faster in the center of the stream than near the outer peripheral edge. The unequal velocities across the fluid stream discharging from aperture 12 produces a circular rotation of the air as it travels normal to the surface plate 11. As a result the air being discharged from aperture 11 forms a vortex having a ring or torus shape with a circulation about a circular axis extending through the center of the torus. In the present invention, we maintain the fluid flow in a laminar flow condition. Generally, by maintaining the Reynolds number, which is ratio of viscous forces to inertia forces below 2000 the fluid can be maintained in a laminar flow condition. By limiting the velocity of the air through the aperture by controlling the amplitude and frequency of the membrane one can ensure that the flow can be maintained in a laminar flow state.

FIG. 2 shows a cross sectional view of two torus shaped vortices with the circulation of the fluid within the torus indicated by the arrows. This torus shape is similar to a smoke ring that is expelled from a smoker's mouth. FIG. 2 also illustrates a first fluid ring 38 that is being formed by a pulse of air from chamber 15 and a second fluid ring 39 that was formed by a previous pulse of air from chamber 15. Additional fluid rings can be intermittently formed by a high frequency pulsing of the membrane 14. By maintaining the pulsing energy sufficient low to maintain the Reynolds number of the fluid less than 2000 results in a sequence of laminar flow vortex that move away from the surface plate 33.

In order for the chamber 15 to refill once the torus 38 has exited the immediate region of the surface plate, the incoming air must travel along the surface of the surface plate 11 and through aperture 12. This flow path laterally along the surface 11 ensures that the air expelled in a torus by the orifice 12 will not be the same air used to replenish the air in chamber 15. As the amount of air leaving the chamber is equal to the amount of air entering the chamber it produces a zero net flux device. The frequency of the output of torus shaped vortices is limited by the need to maintain a laminar flow of fluid through the orifice in both directions. Should the flow of fluid be allowed to become turbulent, which generally occur with a Reynolds Number exceeding 2000, the flat fan system will lose effectiveness as vortex formation is limited within a disturbed flow environment.

Figure 3:
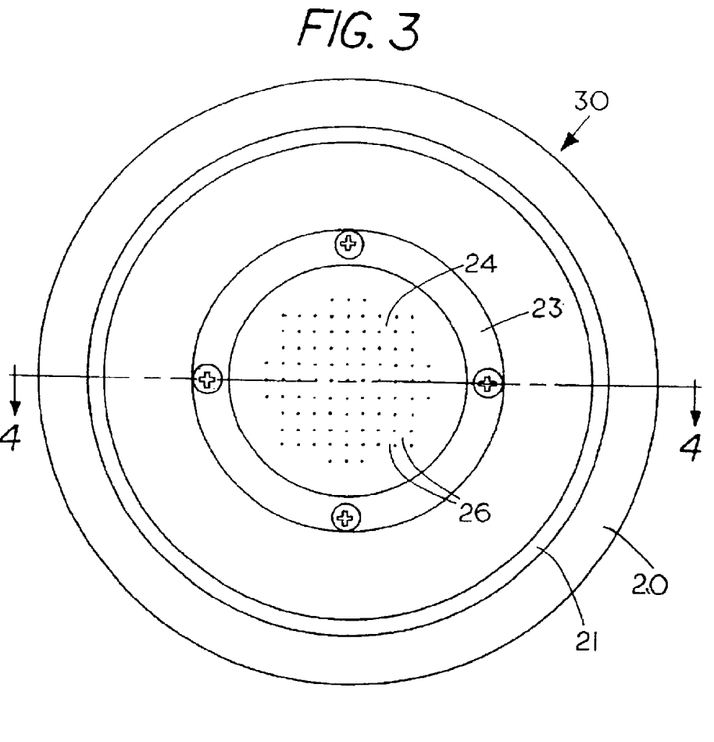
FIG. 3 is a top view of the flat fan device having an array of apertures positioned so as to provide a maximum flow advantage.
Figure 4:
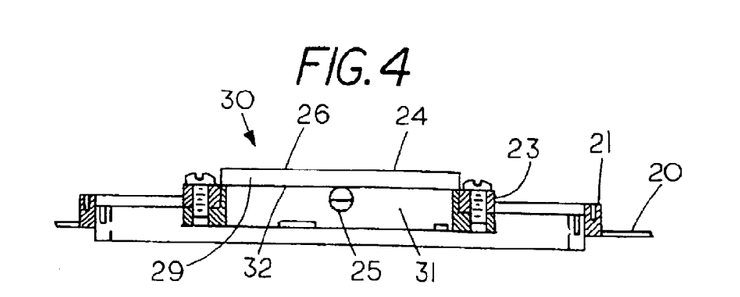
FIG. 4 is a cross-sectional view of the flat fan device of FIG. 3 showing the surface plate with the apertures therein and the single fluid supply chamber behind the surface plate.

While the principal of operation of a synthetic fluid jet device is illustrated in FIG. 1 and FIG. 2 together with a unique membrane vibrator, a system for generating a significant fluid flow utilizing an array of apertures and a single chamber is illustrated in FIGS. 3 and 4.

FIG. 3 is a top view of the flat fan device 30 depicting a circular housing flange 23 having an expelling plate 24 with an array of holes 26 located so as to provide maximum flow while maintaining laminar flow conditions. Flat fan device 30 includes an outer circular housing member 21 that is secured to a support 20 for attachment to a surface of an object that is to be cooled.

FIG. 4 is a cross-sectional view of the flat fan device of FIG. 3 taken along the lines 4—4 showing the array or expelling plate 24 located in front of a single chamber 29 which is located directly behind the array plate 24. A membrane 32 extends across housing 23 to form a chamber 29 behind the array plate 24. Attached to membrane 32 is a vibrator 25 which is located within a second chamber 31. In the embodiment shown the vibrator 25 is positioned outside the flow chamber 29; however, the vibrator could also be located within chamber 29 if the maximum amplitude of the membrane 32 during oscillation does not cause the vibrator to become ineffective by contact with the backside of the expelling plate 24. As can be seen in FIG. 4 a single chamber 29 is located behind an expelling plate having a plurality of holes or orifices therein to provide a low profile flat fan device.

Figure 5:
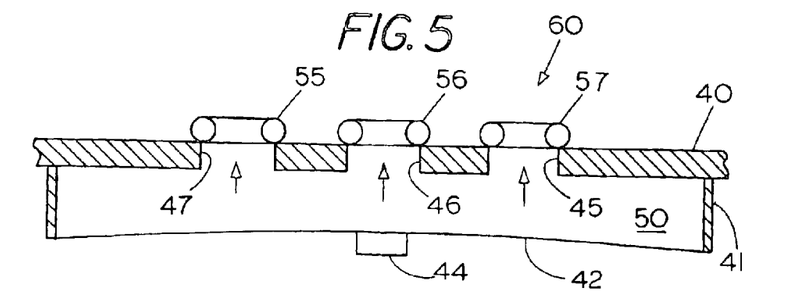
FIG. 5 is a partial schematic view illustrating the multiple torus flow pattern created by a synthetic jet device having a plurality of orifices as the fluid moves normal to an expelling surface.
Figure 6:
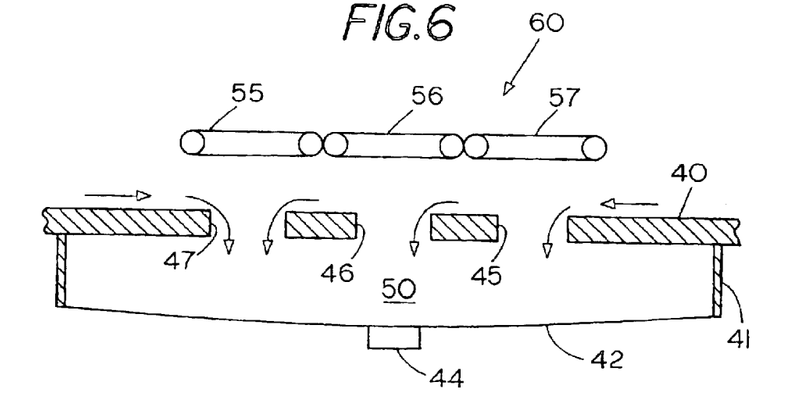
FIG. 6 is a partial schematic view of FIG. 5 illustrating the multiple torus flow pattern as each of the vortices have moved away from the expelling surface.
Figure 7:
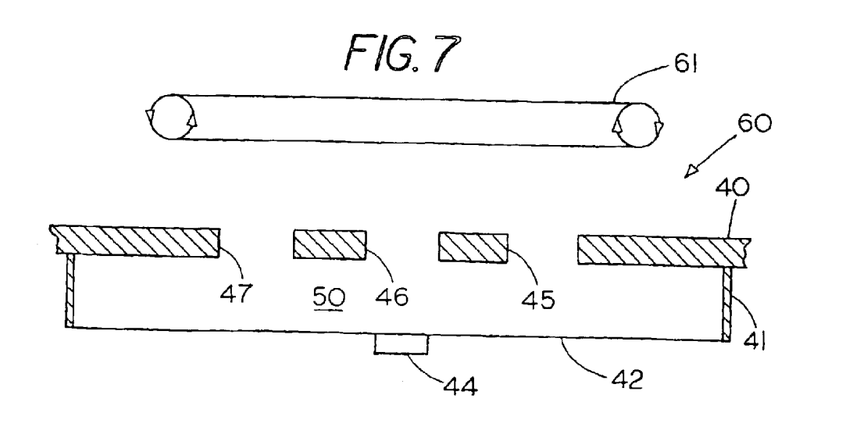
FIG. 7 is a partial schematic view of FIG. 5 illustrating how the multiple torus flow pattern have coalesced with each other to form a single torus vortex continue to move normal to the expelling surface.

In order to illustrate the array operation of the invention reference should be made to FIGS. 5–7 that illustrates a sequence of events occurring when a single chamber is used in conjunction with an array plate having a plurality of holes therein.

FIG. 5 shows a flat fan device 60 comprising an array plate 40 having a plurality of apertures 45, 46 and 47 with a side wall 41 connected to plate 40 and flexible member 42 to creates a chamber 50. While FIG. 1 illustrates a single chamber for each orifice the device illustrated in FIG. 2 shows a single chamber 50 and a torus is located at each of the orifices. That is, the movement of member 42 produces multiple vortices, a first torus 55, a second torus 56 and a third torus 57 each being expelled normally from expelling plate at substantially the same time. By positioning of a number of apertures in the array plate in a concentrically spaced arrangement one can ensure that approximately equal amounts of air is expelled through each of the apertures and that a laminar flow condition is maintained at each aperture.

The concentrically spaced aperture arrangement which provides substantially equal aperture discharge areas at concentric regions of the array has been found to maximize the ability of the air to be expelled through the apertures 45, 46 and 47 utilizing a single actuating membrane while at the same time maintaining a laminar flow condition throughout the aperture plate. A regular evenly spaced pattern could result in a lower flow velocity along the outer edges of the pattern due to the larger area provided by the larger number of holes. The concentric arrangement of orifices to provides nearly uniform discharge area within a given radial distance from the center and provides for formation of toruses of equal strength at each of the apertures in the array expelling plate 40. The maintenance of a nearly flat velocity profile for the expelled fluid maintains and sustains the toruses over a long distance.

FIGS. 5–7 demonstrates a simplified version of the array of holes or apertures 8 utilized in the surface plate 40. For purposes of illustrating the operation of the invention the array of apertures is reduced to three specific orifices 45, 46, and 47 to demonstrate the coalescing feature of the invention.

In the embodiment shown, the three orifices 45, 46 and 47 are located adjacent to one another within the surface plate 40. The motion of membrane 42 provides a change in volume of the chamber 50, resulting in the expulsion of fluid through the orifices 45, 46 and 47. This results in the aforementioned vortex at each orifice.

FIG. 5 shows that as the multiple vortices 55, 56 and 57 are substantially formed at the same time. The vortices are located essentially normal to the plate 40 and evenly spaced from each other. Note, that the multiple vortices 55, 56 and 57 are formed by a single membrane 42. Consequently, the vortices 55, 56 and 57 move at the same velocity and in the same direction away form plate 40. As these vortices 55, 56 and 57 continue to move away from the surface plate 40, they reach a point where they touch at the outer perimeters illustrated in FIG. 6.

FIG. 6 illustrates each of the vortices 55, 56 and 57 where the integrity of each of the torus shaped vortices is about to disappear and be replaced with a single torus shaped vortex. FIG. 6 also illustrates the flat fan device 60 illustrating the position and size of the torus 55, 56 and 57 a few moments after being expelled from their respective apertures. Note, each of the torus 55, 56 and 57 have increased their torus diameter and each have increased their torus cross section as they move away from expelling plate 40. FIG. 6 illustrates the point where the outer annular surface of each of the torus engages the outer annular surface of an adjacent torus.

FIG. 7 illustrates the coalescing effect as torus 55, 56 and 57 at a later moment in time. That is, vortices 55, 56 and 57 have coalesces to form a single torus 61. The single torus 61 has gained the energy of all the smaller vortices and produces a substantial flow of air in a single torus that continues to travel outward until it encounters an object. Thus through use of a set of spaced apart apertures one can focus the energy of an expelled vortex by combining it with other expelled vortices. Thus the present flat fan invention can produce a laminar flow of air normal to the surface plate and directed essentially in a straight line away from the expelling plate 40. The coalesced flow continues in a straight line until air friction reduces the velocity of the air motion within the torus until the torus slows to the point of vortex collapse. Through coalescing of the torus shaped vortexes after expulsion from the expelling plate we have produced a the flat fan invention that can propel a fluid such as air a significant distance from the flat fan device.

Figure 8:
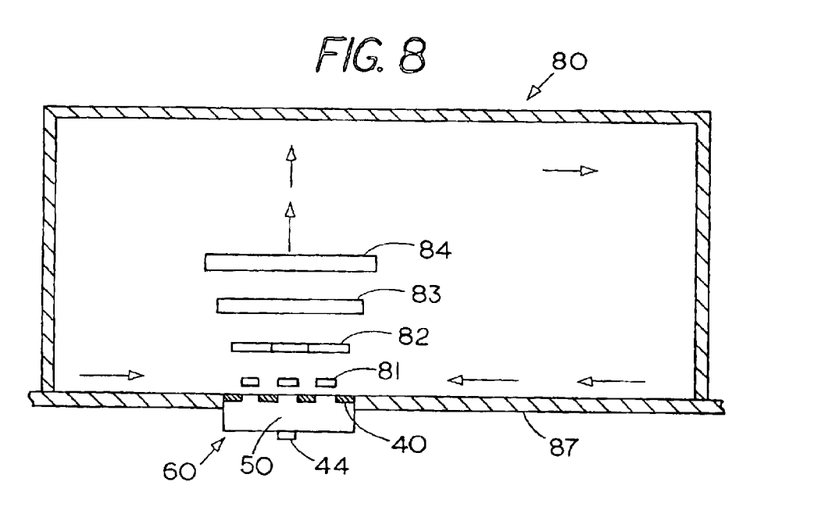
FIG. 8 is a cross-sectional view of a simplified flat fan device illustrating the fluid circulation obtained within an enclosure.

FIG. 8 is a cross-sectional view of a simplified flat fan device 60 illustrating the fluid circulation obtained within an enclosure 80. Enclosure 80 includes a member 87 which is to be cooled by flow of air therepast. The flat fan 60 which is illustrated in FIG. 5 is positioned in the plane of member 87 with the array plate 40 extending along the plane of member 87. A set of sequential torus shaped vortexes are shown positioned normal to array plate 40. The first set of torus shaped vortices 81 are in a spaced apart condition, the second set of torus shaped vortices 82 are in outer annular surface contact with each other but are still have the integrity of an individual torus. Located beyond torus 82 is a single torus shaped vortex 83 that has been formed from the coalescing of multiple vortices. Located in a direction normal to plate 40 and beyond array plate 40 is a further torus 84 which has moved further away from plate 40. As a result of the normal direction of the torus shaped vortices away from plate 40 and the coalescing of the vortices one can induce a substantial circulation of air within enclosure 80 as indicated by the arrows therein. As a result the air returning to chamber 50 can flow past member 87 to induce heat transfer. Thus a continued sequential generation of torus shaped vortices can be used to induce fluid flow past an object to be cooled. By maintaining the fluid flow in the vortices in a laminar flow condition one creates a high efficiency heat transfer device.

Figure 9:
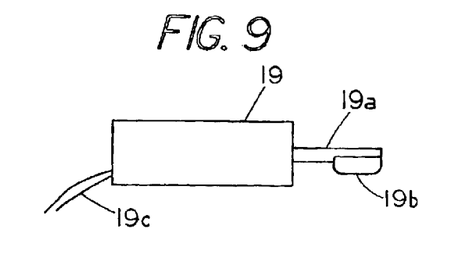
FIG. 9 is a front view of a vibrator comprising a dc motor having a rotating shaft with a radially offset weight.
Figure 10:
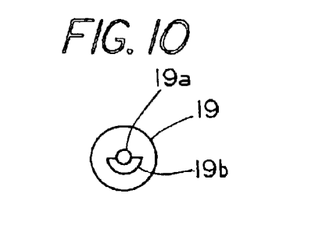
FIG. 10 is an end view of the vibrator of FIG. 9.

FIG. 9 is a front view of a vibrator comprising a dc motor 19 having a rotating shaft 19a with a radially offset weight 10b mounted thereon. FIG. 10 is an end view of the vibratory of FIG. 9 showing the position of offset with 19b with respect to shaft 19a.

An actuator or vibrator member 19 can be located either within the chamber and in engagement with membrane or outside the chamber and in engagement with the member as illustrated in FIG. 3. The purpose of the vibrator member 28 is to physically change the position of the membrane. This actuator must be reasonably small and efficient to enable the movement of the membrane at a high frequency while simultaneously limiting the amount of energy consumed. The lower consumption of energy of the vibrator enables the flat fan to cool a given volume without the inadvertent introduction of additional heat sources. A vibrator member comprises a dc motor with an offset or eccentric weigh secured to the shaft of the dc motor provides an ideal vibratory source since a small amount of energy is required to produce the necessary vibration to drive the membrane in a back and forth manner to force fluid out of chamber and to draw fluid into chamber.

The combination of multiple vortices occur at some distance after initial contact which will vary based upon fluid viscosity and velocity of the flow stream. Although some elements of the original vortices remain, this combination effect results in a focused stream of fluid that can travel a significant distance prior to dissipating. This feature is useful as it provides more focused airflow than might be expected from a turbulent flow device such as a rotating fan blade using the same energy input. In addition the combining effect results in the flow traveling much farther than if there were not combined. Thus the invention can be utilized as a focused stream of fluid or as a fluid stirring system for an enclosure.

Figure 11:
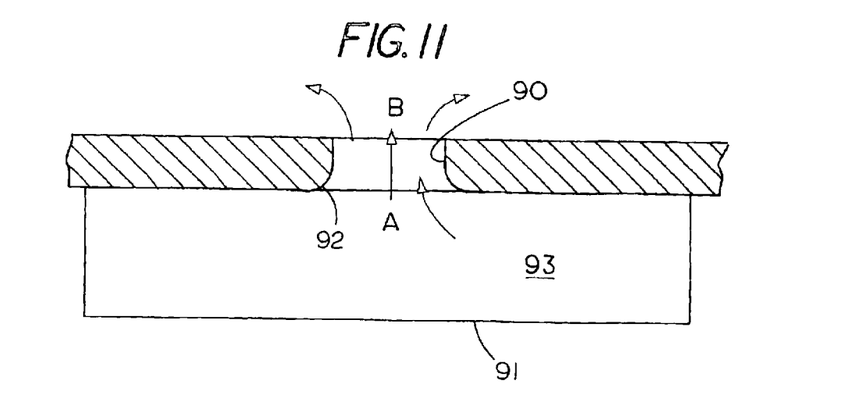
FIG. 11 is a schematic view if an orifice and fluid chamber for illustrating the fluid flow regimes proximate the orifice.

FIG. 11 shows an orifice 90 in cross-section to illustrate the additional cooling of the fluid stream by taking advantage of the Venturi effect. In this particular case, two data points will be examined, which are depicted by A and B respectively. At point A, the fluid is pushed into the orifice due to upward movement of the member 91. Note that this diagram shows only a single orifice, but the concept can be expanded to include any number of orifices with a single chamber. The higher pressure at point A results in fluid flow through the beveled orifice towards B. Note that the bevel 92 is included on the inner side of the orifice and is in the chamber in order to smooth the pressure transition from the chamber into the orifice body. This transition results in a fluid traveling through the orifice 90, where it is expelled at point B. The corners of orifice on the outside of orifice 90 are sharp in order to get the torus to detach properly. The Venturi effect then occurs, where rapid expansion of the pressurized fluid against the surrounding environment will result in a rapid cooling of the fluid. This can be illustrated with the Universal Gas Law.

It is known that:

$$P_A V_A = N\ R_A T_A$$

Likewise:

$$P_B V_B = N\ R_B T_B$$

These two equations can be related by virtue of their conservation of energy within a system, and after simplification, it can be seen that:

$$P_A V_A / N\ R_A T_A = P_B V_B / N\ R_B T_B$$

The Universal Gas Constant and Reynolds Number cancel:

$$P_A V_A / T_A = P_B V_B / T_B$$

Finally:

$$T_B / T_A = P_B V_B / P_A V_A$$

This equation demonstrates that as the fluid expands at point B, denoted by an increase in volume, the temperature decreases. This is primarily due to the fact that the vortex formation keeps the pressure from dropping rapidly, and results in an overall cooling of the fluid stream. This cooling effect has been measured in physical models of the flat fan synthetic jet array. Thus, a synthetic jet array as described herein is useful as a cooling device when coupled with a beveled orifice, which will provide fluid stream cooling based upon the Venturi effect.

When the fluid is brought into the chamber 93 by means of the retraction of piston 91, the fluid mixes within the chamber 93 with the fluid located adjacent to the surface of piston 91. While the newly introduced fluid moves across the surface of piston 91, it transfers heat from the fluid to the piston. In the event the piston is located outside a closed system the use of a flat fan can provide a net decrease in thermal energy within a closed system by extracting heat from the piston.

Thus with the present invention a vibrating flexible membrane causes a volume of the fluid chamber to periodically increase and decrease with the decrease in volume of the fluid chamber simultaneously expelling a fluid vortex from each of a plurality of spaced apertures with the fluid vortex expelled from each of the plurality of spaced apertures coalescing to create a larger fluid vortex.

Additional methods would include electromechanical means of causing motion of the membrane. For example, a fixed magnet can be attached to the membrane surface, and a moving magnetic field can be introduced. This can result in predictable movement of the magnet in response to the changing fields. A similar device can be provided where a moving electromechanical coil is introduced into a fixed magnetic field resulting in relative motion between the membrane and the flat fan surface. These additional methods typically require more energy input to provide flow, requiring further cooling from the flat fan device.

We claim:

1. A fluid flow generating device comprising:
   a housing, said housing having a plurality of spaced apertures therein for fluid ingress and fluid egress therethrough;
   a flexible membrane, said flexible membrane and said housing forming a fluid chamber in said housing; and
   a vibrator member, said vibrator member vibrating said flexible membrane to cause a volume of the fluid chamber to periodically increase and decrease with the decrease in volume of the fluid chamber simultaneously expelling a fluid vortex from each of the plurality of spaced apertures wherein each of the fluid vortex expelled from each of the plurality of spaced apertures coalesce to create a larger fluid vortex.

2. The fluid flow generating device of claim 1 wherein the periodically increase and decrease in the volume of the fluid chamber is insufficient to produce turbulent flow.

3. The fluid flow generating device of claim 1 wherein the fluid chamber contains a fluid selected from the group consisting of air, water and oil.

4. The fluid flow generating device of claim 1 wherein the increase in the volume produces a lateral fluid flow past electronic components to thereby cool the electronic components.

5. The fluid flow generating device of claim 1 wherein the vibrator member comprises an eccentric rotating weight secured to said membrane.

6. The fluid flow generating device of claim 1 wherein the vibrator member comprises a magnet within a changing electrical field.

7. The fluid flow generating device of claim 1 wherein the fluid flow generating device comprises a structural element of an item to be cooled.

8. The fluid flow generating device of claim 1 wherein a laminar flow condition exists within the fluid vortex expelled from each of the plurality of apertures.

9. A flat fan device for heat transfer comprising:
   a housing, said housing including a plurality of apertures concentrically arranged for discharging equal amounts of fluid therethrough at equal time intervals;
   a piston, said piston and said housing forming a fluid chamber in said housing; and
   a vibrator, said vibrator comprising a rotatable offset weight said vibrator vibrating said piston to cause a volume of a fluid in the chamber to periodically increase and decrease with the decrease in the volume of the fluid chamber simultaneously expelling a fluid vortex from each of the plurality of apertures said fluid vortexes moving in a direction normal to the housing wherein each of the fluid vortex expelled from each of the plurality of apertures coalesce to create a larger fluid vortex and an increase in the volume of the fluid chamber producing a fluid flow latterly along the housing until the fluid can enter the fluid chamber through the apertures.

10. The flat fan device of claim 9 wherein the piston comprises a flexible membrane.

11. The flat fan device of claim 10 wherein each of the plurality of the apertures has a radiused lip within the fluid chamber.

12. The flat fan device of claim 9 wherein said a plurality of apertures are located in a spaced arrangement in said housing.

13. The flat fan device of claim 12 wherein the plurality of apertures located in a spaced arrangement in said housing are in fluid communication with a common chamber located proximate said housing.

14. The flat fan device of claim 13 wherein the plurality of apertures located in a spaced arrangement in said housing are concentrically positioned to provide substantial equal flow rates through each of the plurality of apertures.

15. The flat fan device of claim 14 wherein the Reynolds number of fluid flowing through said apertures is less than 2000 to ensure a laminar flow condition.

16. The method of cooling an object comprising:

flexing a membrane in a first direction to direct a fluid in a normal direction through a plurality of spaced apertures to create a plurality of radially expanding fluid torus shaped vortexes each traveling normally away from said plurality of spaced apertures at the same velocity to cause each of the radially expanding fluid torus shaped vortexes to radially expand into an adjoining radially expanding fluid torus shaped vortexes thereby causing the radially expanding fluid torus shaped vortexes to coalesce into a single composite radially expanding torus shaped vortex; and flexing the membrane in a second direction to allow fluid to move laterally along a housing surface until the fluid is drawn into a fluid chamber proximate the membrane.

17. The method of claim 16 including cooling an object by maintaining the fluid flow in a laminar flow state.

18. The method of cooling of claim 17 by providing a curved lip on each of the apertures to produce a Venturi effect.

19. The method of cooling of claim 18 wherein flexing the membrane comprises flexing the membrane with a rotating shaft having an offset weight.

20. The method of cooling of claim 19 including concentrically spacing the apertures to form areas of equal flow through each of the apertures.

21. The method of cooling of claim 19 by maintaining the fluid in a laminar flow state.

22. The method of cooling of claim 19 including the step of placing a cooling device in an enclosure to produce circulation of fluid within the enclosure.

23. The method of cooling of claim 19 including the step of securing the membrane to a housing and securing the housing to an article to be cooled.

24. The method of cooling of claim 17 including the step forming a curved lip in the chamber and a sharp lip on the outside of the chamber.

* * * * *